May 12, 1959 — A. R. CRANDALL — 2,886,297
BRINE CREAMING OF LATICES
Filed Dec. 26, 1956

INVENTOR.
A.R. CRANDALL

BY *Hudson & Young*

ATTORNEYS

United States Patent Office 2,886,297
Patented May 12, 1959

2,886,297

BRINE CREAMING OF LATICES

A Ralph Crandall, Borger, Tex., assignor to Phillips Petroleum Company, a corporation of Delaware Application December 26, 1956, Serial No. 630,646

4 Claims. (Cl. 259—4)

This invention relates to a process for creaming polymer or copolymer latices as well as mixtures of said latices and carbon black slurries referred to as masterbatching in a coagulation system. Another aspect of this invention relates to an improved creaming device. In a more specific aspect, this invention relates to a tangential entry mixing device and to an improved process for creaming polymer, copolymers, and masterbatches in a coagulating system using said device.

In the production of polymers, copolymers, or masterbatches, creaming refers to thickening or partially destabilizing soap-emulsified latices. In the production of polymeric, copolymeric, or masterbatch materials from these soap-emulsified latices by the brine coagulation method, the soap-emulsified latices are creamed by mixing a sodium chloride solution with the latex or carbon black-latex mixtures. The degree of creaming determines the size of the resultant crumb when coagulation occurs with the use of dilute sulfuric acid. The trade has coined the word "carbex" to be applied to a carbon black slurry and latex mixture. I will use carbex in this specification and the attached claims referring to such mixtures.

In the conventional method of creaming with brine, the brine is introduced directly into the latex or carbex line prior to the discharge of said latex or carbex into the coagulation vessel. The line will have several pipe L's in order to promote mixing. In such an arrangement, the line tends to foul or plug. As a consequence the length of the creaming section must be kept to a minimum and complete mixing is difficult to obtain.

I have now found that the brine and latex or mixtures of carbon black and latex can be thoroughly creamed in a relatively short distance thereby avoiding plugging difficulties by use of my invention. I have also found that the introduction of an inert gas along with the brine and latex or carbex produces a more porous crumb formation when the creamed material is coagulated. The more porous crumb facilitates leaching, washing and drying.

An object of this invention is to provide an improved creaming method. A further object of this invention is to provide an improved creaming device. A still further object of my invention is to provide a creamed latex or carbex which will result in a superior crumb when coagulated.

This is a continuation in part of my copending application for "Brine Creaming of Latices," filed September 28, 1953 and having Serial No. 382,709, now abandoned.

My invention is particularly applicable for creaming soap emulsified rubber producing latices and mixtures of carbon black and latices. The polymerization of monomeric material in aqueous emulsion is well known in the art. In effecting such emulsion polymerization of a monomeric material, particularly when a batch-type or semi-batch type operation is carried out, the reactor is usually first charged with the aqueous medium, which contains the desired emulsifying agent, and the monomeric material is then added while agitating the contents. At the same time a reaction modifier, such as a mercaptan, is also included, usually in solution in at least a part of the monomeric material. An activator solution and an oxidant are separately added to the reaction mixture, and then the polymerization proceeds. The activator solution may be, and usually is, incorporated in the aqueous medium prior to the addition of the monomeric material, and then the oxidant is added as the last ingredient. Sometimes, however, satisfactory polymerization results can be obtained when the oxidant is incorporated prior to addition of the activator which is added as the last ingredient. It is also sometimes the practice to add portions of one or the other of the activator solution and oxidant intermittently, or continuously, during the course of the reaction. If the operation is carried out continuously, streams of the various ingredients are admixed in somewhat the same order as they were in the hereinabove described batch process prior to their final introduction into the polymerization reaction zone.

As was hereinbefore indicated, this invention is particularly applicable to those polymers and copolymers which are rubbery in nature. These polymers are produced by polymerization of monomeric material which generally contain the characteristic structure $CH_2=C<$ and, in most cases, have at least one of the disconnected valence bonds attached to an electronegative group, that is, a group which increases the polar character of the molecule such as a chlorine group or an organic group containing a double or triple bond such as vinyl, phenyl, cyano, carboxy or the like. Included in this chain of monomers are the conjugated dienes such as butadiene (1,3-butadiene), 2,3-dimethyl-1,3-butadiene, isoprene, piperylene, 2-furyl-1,3-butadiene, 2-methoxy-1,3-butadiene and the like; haloprenes, such as chloroprene (2-chloro-1,3-butadiene), bromprene, methylchloroprene (2-chloro-3-methyl-1,3-butadiene), and the like; aryl olefins such as styrene, various alkyl styrenes, p-chlorostyrene, p-methoxy-styrene, alpha-methylstyrene, vinylnaphthalene and similar derivatives thereof, and the like, acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methylacrylamide and the like, methyl isopropenyl ketone, methyl vinyl ketone, methyl vinyl ether, vinylethynyl, alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the type described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diene with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber, although, as can be readily deduced from the foregoing, there is a host of possible reactants, the most readily and commercially available monomers at present are butadiene itself (1,3-butadiene) and styrene. With these specific monomers, it is usually preferred to use them together, in relative ratios of butadiene to styrene between 25:75 and 95:5 parts by weight.

The process of masterbatching refers to the addition of typical types of reinforcing carbon blacks, that are well known throughout the art, to polymers or copolymers of the above descriptions. Such carbon blacks are prepared for plant processing in an aqueous medium being dispersed and maintained in a suspended state with proper amounts of dispersing agents. The carbon black slurry is proportioned and mixed with the above described types of polymeric or copolymeric latices prior to the creaming and coagulation processes.

My invention can best be described by referring to the attached drawings.

Figures 1, 2:
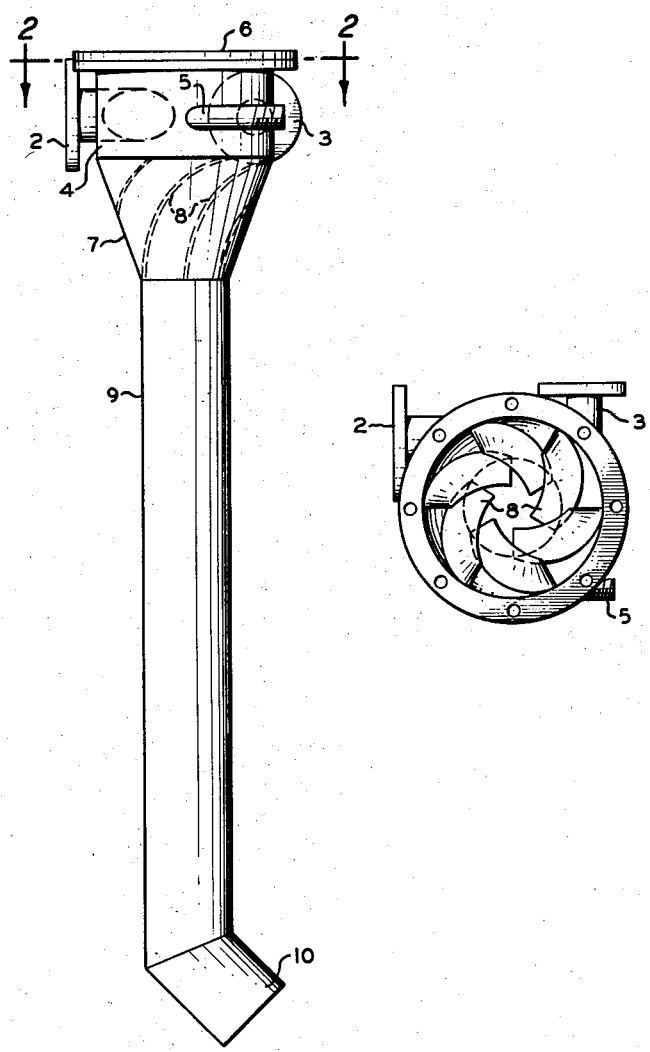
Figure 1 is a front elevational view of my mixing or creaming device.
Figure 2 is a sectional view taken along the line 2—2 of Figure 1, looking in the direction of the arrows.

Referring now to the drawing, a latex feed pipe 2 and a brine feed pipe 3 are spaced approximately 90 degrees apart and enter a cylindrical feed chamber 4 tangentially. The spacing of the various tangentially entering conduits is not critical, the 90 degree separation being for convenience only. A gas pipe 5, which also enters the chamber 4 tangentially may be placed at any point between pipe 2 and 3, the most convenient place being 90 degrees from one and 180 degrees from the other. Feed pipes 2 and 3 are free flowing while gas pipe 5 may be free flowing or nozzled. A removable lid 6 is provided for easy access and cleaning.

Depending from the chamber 4 is a tapered or frustoconical section 7 within which are disposed a plurality of curved baffles 8. Each baffle 8 is formed from a metal ribbon or plate of helical contour having its inner edge 8a suitably secured, as by welding, to the inner wall of section 7, its top edge 8b level with the upper end of section 7, and its bottom edge 8c level with the lower end of section 7. As shown, six such baffles are arranged equidistantly about the inner wall of frustoconical section 7, and normal thereto. Any suitable number of baffles may be used, and they can be disposed slantwise with respect to the aforesaid inner wall, the number and arrangement being such that a controlled whirling turbulent movement is imparted to fluid passing downwardly from the chamber 4 through frustoconical section 7, the velocity of the movement increasing as the fluid progresses from the top of the bottom of this section. The section 7 is joined to a downspout 9 which in turn empties into a coagulation vessel (not shown) through a bent section 10. These baffles are substantially wider than they are thick, e.g., at least 3:1 and preferably at least 6:1 and extend substantially the entire distance from the top to the bottom of the conical section.

To illustrate the process of my invention, I will again refer to the figure. Latex or carbex is fed to the feed chamber of the creaming device through pipe 2; brine is fed to the feed chamber through pipe 3 and air is admitted to said chamber through pipe 5. As the material gravitates it comes into contact with baffles 8 which provide some resistance to flow thus causing some turbulence. The angle of curvature of these baffles creates a tangential flow in the tube or downspout 9 and the combination of these two motions causes the brine and latex or carbex to mix resulting in the desired degree of creaming. The whirling movement of the material in tube 9 causes it to have a longer residence time therein than would be the case if the material merely gravitated through the tube without any whirling movement. At the same time air is incorporated into the creamed latex. I have found that when an inert gas such as air, nitrogen, oxygen and the like are incorporated in the latex, i.e., the latex is the continuous phase, during the creaming step and thereafter coagulating the latex, the particles of crumb are much superior to the crumb resulting from coagulating creamed latex in the absence of such gas. This is true even when the latex is vigorously agitated during the creaming step such as by exampling mechanical stirring, air agitation and the like. That is, the gas is incorporated in the cream as described in Example II.

To further illustrate the advantages of my invention the following examples are given.

*Example I*

Brine was introduced into a nominal 4" diameter steel pipe which was conveying a soap-emulsified latex. The material was passed for a distance of 36" including two right angle bends after which it was dumped into a coagulation vessel along with acid. A sample of the brine-latex mixture was taken from the end of the line and observed. The brine and latex were not thoroughly mixed and the cream was not uniform. A sample of the coagulated crumb was taken and observed. This crumb was not uniform in size having many particles below and above the average size. The filtering, washing, leaching, and drying of the crumb was more difficult than were these operations on the material made as described below. The above system can be operated approximately one week without cleaning of the 36 inches of the 4" pipe section.

*Example II*

A run was made using the method and device of my invention. The feed section of the tube was one foot in diameter and 6 inches deep. The latex feed line was a nominal 3" diameter steel pipe, the brine feed line was a 2" diameter steel pipe, and the air line was a 1" diameter steel pipe. The tapered baffled section was 8 inches deep and tapered from 1 foot diameter to 6 inches in diameter. This baffled section contained 6 baffle plates. The downspout section was 6 inches in diameter and 42 inches long. The process was used two weeks without cleaning. The same rate of latex and brine flow was used as was used in the above described run and the creamed latex was dumped into the same coagulation vessel. A sample of the creamed latex was observed and it has a smooth creamy appearance and appeared to be thoroughly mixed. A sample of the resulting crumb was examined. This material was very uniform in size and appearance. It also appeared to be more porous than was the crumb obtained in the first run described above. This crumb material filtered, washed, leached and dried much easier than did the material obtained in the previously described run.

I have illustrated my invention in one of its preferred embodiments but I do not limit my invention to this embodiment. One skilled in the art will see many variations which can be made without departing from the scope of this invention. For example, the size of my device will be dependent upon the desired production rate.

I claim:

1. A tangential entry mixing tube comprising in combination a cylindrical section; a first pipe entering said section tangentially to the periphery of said cylindrical section; a second pipe of smaller diameter than said first pipe, said second pipe entering said cylindrical section tangentially to the periphery of said cylindrical section; a third pipe smaller in diameter than said second pipe, said third pipe entering said cylindrical section tangentially to the periphery of said cylindrical section; a tapered section below and communicating with said cylindrical section; a plurality of baffles disposed in said tapered section, said baffles being of helical contour and having a width substantially greater than the thickness thereof and having one edge thereof secured to said tapered section, one edge on a horizontal plane level with the top of said tapered section, one edge on a second horizontal plane on a level with the bottom of said tapered section and the fourth edge projecting into said tapered section a substantial distance and said fourth edge curving downward through said tapered section and being arranged to give a whirling motion to a gravitating material; a sole downspout section below said tapered section and communicating therewith, said tapered section having its lower end communicating solely with said downspout; and an angle section communicating with said downspout, said angle section being of same diameter as said downspout.

2. A tangential entry mixing tube comprising in combination means within the upper section of said tube for admitting a synthetic rubber latex emulsion prepared by emulsion polymerization of monomers containing ethylenic unsaturation tangentially to the periphery of said tube; means for admitting brine tangentially to the periphery of said upper section; means for injecting air tangentially to the periphery of said upper section; a baffle section below and in free communication with said upper section, said baffle section containing a plurality of baffles having a width to thickness ratio of at least 3:1, said baffles being uniformally spaced and each baffle having a helical contour, said baffles having one edge secured to the walls of said baffle section and the opposite edge projecting a substantial distance away from said walls; and a sole downspout, said downspout being in free communication with said baffle section and of sufficient length to provide sufficient time for desired mixing of materials gravitating therethrough.

3. A tangential entry mixing tube for creaming a synthetic rubber latex prepared by emulsion polymerization of monomers containing ethylenic unsaturation, said tube comprising in combination means for introducing brine into the upper section of said tube tangentially to the periphery of said upper section; means for introducing said latex tangentially to the periphery of said upper section; means for introducing air tangentially to the periphery of said upper section; a tapered section disposed below and in free communication with said upper section; a plurality of baffle plates having a width to thickness ratio of at least 3:1 disposed in said tapered section, said baffle plates each having a helical contour and each having one edge secured to the inner wall of said baffle section and the opposite edge projecting a substantial distance into said tapered section; a sole downspout disposed below and in free communication with said tapered section; and a coagulation vessel disposed below and in free communication with said downspout.

4. The mixing tube of claim 3 wherein the baffle width to thickness ratio is at least 6:1.

References Cited in the file of this patent

UNITED STATES PATENTS

| | | |
|---|---|---|
| 2,233,019 | Linderman | Feb. 25, 1941 |
| 2,351,864 | Linderman | June 20, 1944 |
| 2,366,460 | Semon | Jan. 2, 1945 |
| 2,459,748 | Johnson | Jan. 18, 1949 |
| 2,653,801 | Fontein et al. | Sept. 29, 1953 |